(12) United States Patent
Meehan et al.

(10) Patent No.: US 6,950,477 B2
(45) Date of Patent: Sep. 27, 2005

(54) BLIND DUAL ERROR ANTENNA DIVERSITY (DEAD) ALGORITHM FOR BEAMFORMING ANTENNA SYSTEMS

(76) Inventors: Joseph Meehan, 182 E. 95th St., Apartment 28A, New York, NY (US) 10128; William A Sethares, 75 Lake St., Cotuit, MA (US) 02635

( * ) Notice: Subject to any disclaimer, the term of this patent is extended or adjusted under 35 U.S.C. 154(b) by 753 days.

(21) Appl. No.: 09/877,311

(22) Filed: Jun. 8, 2001

(65) Prior Publication Data

US 2003/0031243 A1 Feb. 13, 2003

Related U.S. Application Data

(60) Provisional application No. 60/262,125, filed on Jan. 16, 2001.

(51) Int. Cl.$^7$ ................................................. H04B 7/02
(52) U.S. Cl. ....................... 375/267; 375/229; 375/232; 375/233; 375/347
(58) Field of Search ............................... 375/229, 231, 375/232, 233, 267, 347, 350; 342/378, 380, 383

(56) References Cited

U.S. PATENT DOCUMENTS

| 5,119,401 | A | | 6/1992 | Tsujimoto | 375/14 |
| 5,473,333 | A | * | 12/1995 | Chiba et al. | 342/378 |
| 6,115,419 | A | | 9/2000 | Meehan | 375/233 |
| 6,366,613 | B2 | * | 4/2002 | Sommer et al. | 375/232 |
| 6,418,164 | B1 | * | 7/2002 | Endres et al. | 375/232 |
| 2002/0054655 | A1 | * | 5/2002 | Malkemes et al. | |

OTHER PUBLICATIONS

"Selection Diversity with Decision Feedback Equalizer" by Ishikawa et al., KDD R&D Laboratories, 2–1–15 Ohara Kamifukuoka, Saitama 356, Japan.
International Search Report dated May 27, 2002.

* cited by examiner

*Primary Examiner*—Shuwang Liu
(74) *Attorney, Agent, or Firm*—Sofer&Haroun, LLP

(57) ABSTRACT

An adaptive antenna system includes N antennae, N forward equalizers operatively coupled to a respective one of the N antennae, and N processors performing a constant modulus algorithm (CMA) to thereby generate N respective control signals which adapt coefficients associated with each respective one of the forward equalizer. Preferably, the adaptive antenna system also includes a sampling device receiving a signal based on the collected output of the N forward equalizers, and a feedback equalizer receiving an output of the sampling device and generating a feedback signal biasing the signal received by the sampling device. If desired, the N control signals are applied to the N respective forward equalizers during a first operating mode, and a selected one of the N control signals is applied to the N forward equalizers during second mode of operation. A method of operating a beamforming antenna system is also described.

19 Claims, 4 Drawing Sheets

BLIND DUAL ERROR ANTENNA DIVERSITY (DEAD) ALGORITHM FOR BEAMFORMING ANTENNA SYSTEMS

This application claims priority under 35 U.S.C. § 119(e) to U.S. Provisional Patent Application No. 60/262,125, entitled Blind Dual Error Antenna Diversity (DEAD) Algorithm for ATSC Terrestrial DTV, filed Jan. 16, 2001.

BACKGROUND OF THE INVENTION

1. Field of the Invention

The present invention relates generally to a beamforming antenna system. More specifically, the present invention relates to a beamforming antenna system employing a blind dual error antenna diversity (DEAD) algorithm. Corresponding methods are also disclosed.

2. Discussion of Related Art

Adaptive antenna array technology is being explored for applicability in the domains of wireless communications, sonar, and Acoustic Echo Cancellation (AEC), to name but a few. In land based communications networks, an adaptive antenna array permits more users-per-cell by allowing frequency reuse within the cell. It will be noted that this is achieved primarily by adaptively directing the beam patterns of the receiving and transmitting antennae. Few researchers have considered the applicability of adaptive antenna array technology to the problem of poor signal reception of terrestrial DTV by an indoor antenna.

The ATSC standard set forth by the Advanced Television Systems Committee in the document entitled "ATSC Digital Television Standard" (Document A53, Sep. 16, 1995), for terrestrial Digital TV in the United States requires transmission of an MPEG bit stream of 19.28 Mbps over a bandwidth of 6 MHz at a symbol rate of 10.76 MHz in the VHF and UHF carrier frequency range. The modulation scheme used is a single carrier 8 level Vestigial Sideband (VSB) modulation scheme.

The Advanced Television Standards Committee (ATSC) terrestrial Digital Television (DTV) receivers on the market today are not able to provide reliable reception using an indoor antenna. This is due to low Signal to Noise Ratio (SNR) and multiple close-in multipaths that are caused by the indoor environment. In the indoor environment, the desired signal is attenuated and channel distortion is increased due to nearby reflecting surfaces and significant short reflections from multipath in the home. People moving in the home add dynamic aspects to the multipath. Current state of the art receiver equalization architectures have a single antenna and use a Decision Feedback Equalizer (DFE) to compensate for the channel impairments. It will be appreciated that current equalizer technology only takes temporal equalization into effect.

What is needed is a beamforming structure that produces a narrow, high gain, receiving beam in the direction of the desired signal. Moreover, what is needed is a beamforming structure that produces a narrow, high gain, receiving beam while attenuating the surrounding channel distortion. Furthermore, a beamforming structure implementing a Blind Dual Error Antenna Diversity (DEAD) Algorithm would be extremely desirable, particularly when the DEAD algorithm can be implemented at little additional cost.

SUMMARY OF THE INVENTION

Based on the above and foregoing, it can be appreciated that there presently exists a need in the art for an adaptive Digital Broadband Beamforming (DBBF) antenna system which overcomes the above-described deficiencies. The present invention was motivated by a desire to overcome the drawbacks and shortcomings of the presently available technology, and thereby fulfill this need in the art.

According to one aspect, the present invention provides an adaptive antenna system, including N antennae, N forward equalizers operatively coupled to a respective one of the N antennae, and N processors performing a constant modulus algorithm (CMA) to thereby generate N respective control signals which adapt coefficients associated with each respective one of the forward equalizer. Preferably, the adaptive antenna system also includes a decision device receiving a signal based on the collected output of the N forward equalizers, and a feedback equalizer receiving an output of the decision device and generating a feedback signal biasing the signal received by the decision device. If desired, the Nth control signal generated by the Nth processor adapts coefficients associated with the feedback equalizer. Moreover, in the adaptive antenna system, each of the N processors implements the expression $$c_n(k+1)=c_n(k)+v_k \hat{I}_k(\hat{I}_k^2-|\gamma_m|^2)$$

where
$c_n(k)$ is the $n^{th}$ equalizer coefficient at time k,
$v_k$ is the equalizer input,
is the equalizer output, and
$|\gamma_m|^2$ is the CMA constant inside a Godard cost function for the $m^{th}$ antenna.
In an exemplary case, the equation implemented by each processor employs a different coefficient $|\gamma_m|^2$.

According to another aspect, the present invention provides an adaptive antenna system, including first and second antennae, first and second forward equalizers operatively coupled to a respective one of the first and second antennae, a first combiner receiving first and second forward equalizes signals generated by the first and second forward equalizers, a sampling circuit receiving a signal based on the combined signal output by the first combiner, and first and second processors, each performing a constant modulus algorithm (CMA) to thereby generate respective first and second control signals which adapt coefficients associated with a respective one of the first and second forward equalizers. Preferably, the first processor receives an input signal based on the output of the sampling circuit. If desired, the first and second control signals are applied to the first and second forward equalizers, respectively, during a first operating mode, and the first control signal is applied to the first and second forward equalizers during second mode of operation. In an exemplary case, the adaptive antenna system also includes a second combiner disposed between the first combiner and the sampling circuit, and a feedback equalizer receiving an output of the sampling circuit and generating a feedback signal., wherein the feedback signal is applied to a second input port of the second combiner to thereby bias the signal received by the sampling circuit, and the first control signal generated by the first processor adapts coefficients associated with the feedback equalizer.

According to a further aspect, the present invention provides a beamforming antenna system employing first and second antennae and a blind dual error antenna diversity (DEAD) algorithm, including first forward equalizing circuitry operatively coupled to a first antenna and receiving a first control signal for generating a first forward equalized signal, second forward equalizing circuitry operatively coupled to a second antenna and receiving a second control signal for generating a second forward equalized signal, first processing circuitry for generating the first control signal based on a combination of the first and second forward equalized signals, and second processing circuitry receiving the second forward equalized signal for generating the second control signal. If desirable, beamforming antenna system can also include sampling circuitry for sampling the combination of the first and second forward equalized signals to thereby generate a sampled combination signal, wherein the first processing circuitry receives the sampled combination signal. Preferably, the beamforming antenna system also includes feedback circuitry for generating a feedback signal based on the sampled combination signal. In the latter case, the feedback circuitry generate a bias signal for biasing the combination of the first and second equalized signals, and the coefficients employed by the feedback circuitry are controlled by the first control signal. In an exemplary case, the first and second control signals are applied to the first and second forward equalizing circuitry, respectively, during a first operating mode, while only the first control signal is applied to the first and second forward equalizing circuitry during a second mode of operation.

According to a still further aspect, the present invention provides a method for operating a beamforming antenna system employing first and second antennae and a blind dual error antenna diversity (DEAD) algorithm, including steps for generating a first forward equalizing signal in response to a first antenna signal and a first control signal, generating a second forward equalizing signal in response to a second antenna signal and a second control signal, combining the first and second Forward Equalizing signals to produce a combined signal, generating the first control signal based on the combined signal, and generating the second control signal based on the second forward equalized signal. The method advantageously can include a step for sampling the combined signal to thereby generate a sampled combination signal; in that case, the step of generating the first control signal is performed responsive to the sampled combination signal. If desired, the method also includes steps for generating a feedback signal based on the sampled combination signal, and biasing the combined signal based on the feedback signal. Preferably, the steps for generating the first and second forward equalizing signals further include generating a first forward equalizing signal in response to a first antenna signal and a first control signal using first coefficients, and generating a second forward equalizing signal in response to a second antenna signal and a second control signal using second coefficients, wherein the first and second coefficients are selected responsive to the first and second control signals, respectively.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

Figure 1:
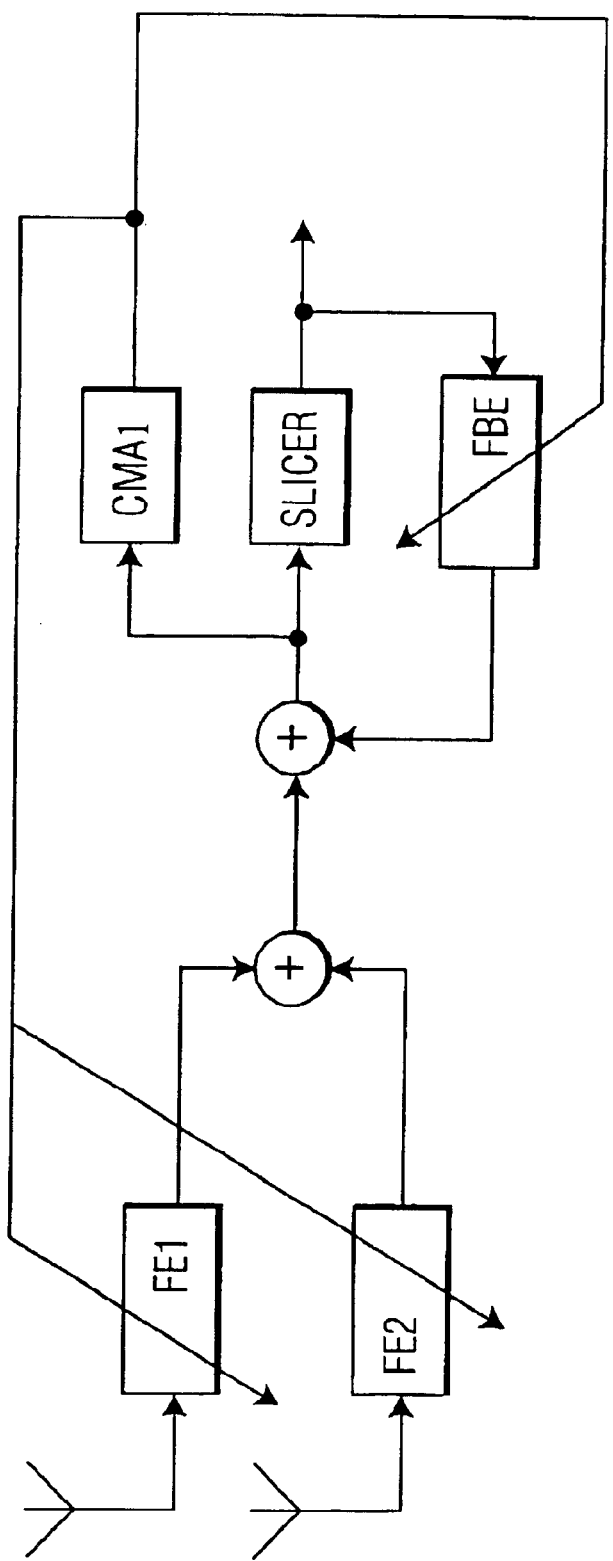
FIG. 1 is a high-level block diagram of a proposed adaptive Digital Broadband Beamforming (DBBF) antenna system utilizing a single feedback signal.

The adaptation of an equalisation structure to a beamforming antenna system produces an adaptive Digital Broadband Beamforming (DBBF) system for receiving an ATSC 8-VSB signal, which is illustrated in FIG. 1. More specifically, FIG. 1 illustrates a high-level block diagram of an adaptive DBBF antenna system 1, which includes two antennas 10 and 20 producing signals applied to Forward Equalisers FE1 and FE2, respectively. The outputs of Forward Equalizers FE1 and FE2 are combined in adder 30 and applied to a second adder 40, the output of which is applied to a decision device (hereinafter slicer) 50. From FIG. 1, it will be appreciated that the output of slicer 50 is applied to the downstream components of the receiver (not shown) and a Feedback Equaliser (FBE), which generates a feedback signal applied to one input port of the adder 40. The DBBF antenna system 1 also includes a processor CMA1, which employs a Constant Modulus Algorithm in generating a signal which adapts the coefficients employed in the Forward Equalizers FE1 and FE2 and the Feedback Equalizer FBE, i.e., the error signal generated by processor CMA1 is used to adapt all the coefficients in the DBBF antenna system 1. A more detailed description of this arrangement can be found in commonly assigned U.S. Pat. No. 6,115,419 to Meehan, which patent is incorporated herein by reference.

It will be noted that channel impairments such as static multipath, dynamic multipath, Intersymbol Interference (ISI), and Co-Channel Interference (CCI) can seriously hinder indoor and outdoor DTV reception. The DBBF antenna system 1 advantageously considers both temporal and spatial equalisation, thereby providing a DTV receiver equipped with such an antenna system an extra degree of freedom.

In order to fully appreciate the various aspects provided by an adaptive DBBF antenna according to the present invention, a brief discussion of the underlying methodologies will now be provided. More specifically, an antenna array is defined as a group of spatially distributed antennae. For an N antenna array, the beam pattern can point at the Direction of Arrival (DOA) of the desired signal and place N−1 nulls in the direction of any interferers. An adaptive antenna array adjusts the phase and gain of each antenna weight (beamformer coefficient) such that the beamformer's output performance is optimised, e.g., minimizing the Mean Squared Error (MSE) of the beamformer output. This permits the antenna array to form a beam pattern with its maximum gain in the direction of the desired signal while attenuating any interfering signals. Thus, the beamforming antenna can be considered as an adaptive filter operating in both the space and time domains. It will be appreciated that the spatial and temporal processing of the beamformer can provide performance improvements for multipath fading channel equalization.

It will be noted that the DBBF is an adaptive antenna array that controls its own beam pattern by means of a feedback control (the error at the decision device) which is active the entire time that the antenna array is operating. It will also be noted that the output of the antenna array is a weighted sum of each antenna element input.

When the input to the antenna array is x(t), the antenna array output is given by equation (1):

$$y(t) = \sum_{n=0}^{N-1} \sum_{m=0}^{M-1} x(t - m\tau) w_{n,m} e^{(-jn\phi)} \quad (1)$$

where N is the number of antennae, M is the number of taps per antenna element, □ is the delay between adjacent taps, $w_{n,m}$ is the $m^{th}$ tap coefficient of the $n^{th}$ element, and φ is the phase difference between the received signal at adjacent antenna elements in a linear array. It will be appreciated that φ is given by equation (2):

$$\phi = \frac{2\pi d \sin\theta}{\lambda} \quad (2)$$

where d is the distance between adjacent elements, θ is the DOA of the received signal and λ is the wavelength of the input signal. In an exemplary case, the antenna transfer function in the spatial and frequency domain can be written in the form of equation (3):

$$H(\omega, \theta) = \sum_{m=0}^{M-1} e^{-jm\omega\tau} \sum_{n=0}^{N-1} w_{n,m} e^{-jn\phi} \quad (3)$$

This equation represents the frequency response when θ is a constant and represents the beampattern when ω is a constant. A typical antenna array is shown in FIG. 1.

It should be mentioned at this point that the gain due to beamforming can be split into two components, antenna gain and diversity gain. Antenna gain is defined as the increase in signal power after summing the antenna element outputs (assuming uncorrelated noise). Diversity gain is defined as the gain due to the fact that the different antennae are spaced apart and the input signals may be uncorrelated, i.e., the antennae may see different channels.

In short, the simplest broadband beamformers have an equalizer structure in each antenna and there is one error signal used to adapt the coefficients of all equalizers. This error signal is based on the signal after the combination of each antenna's equalizer. In contrast, the Digital Broadband Beamformer (DBBF) illustrated in FIG. 1 includes two Forward Equalizers (FE1 and FE2) and one Feedback Equalizer (FBE); in this case, only one error signal is used to adapt all the coefficients. However, it will be appreciated that the adaptive DBBF antenna system 1 is not employing all the available parameters and information associated with the received signal.

Figure 2:
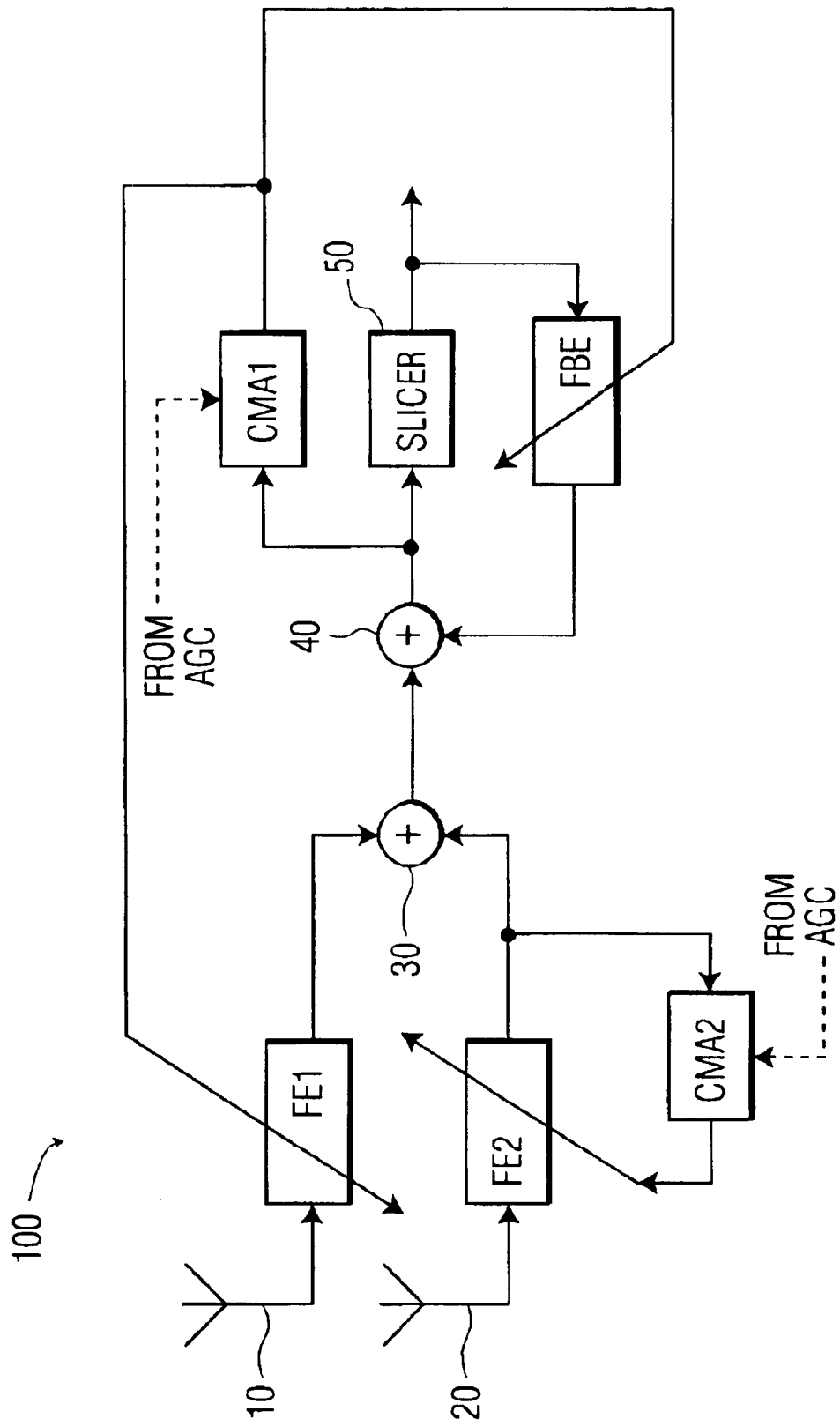
FIG. 2 is a high-level block diagram of one preferred embodiment of an adaptive antennae structure utilizing multiple feedback signals according to the present invention.

The improved adaptive DBBF antenna system employing a blind dual error antenna diversity (DEAD) algorithm according to the present invention has a signal flow similar to that of the adaptive DBBF antenna system 1 illustrated in FIG. 1, the primary difference being in the details regarding the adaptation of the equalizers. FIG. 2 illustrates an adaptive DBBF antenna system 100 according to one preferred embodiment of the present invention, which system employs a blind DEAD algorithm. More specifically, the adaptive DBBF antenna system 100 includes two antennas 10 and 20 producing signals applied to Forward Equalizers FE1 and FE2, respectively. The outputs of forward equalizers FE1 and FE2 are combined in adder 30 and applied to a second adder 40, the output of which is applied to slicer 50. The output of slicer 50 is applied to both downstream components of the receiver (not shown) and a Feedback Equalizer (FBE), which generates a feedback signal applied to adder 40. The DBBF antenna system 100 also includes a processor CMA1, which employs a Constant Modulus Algorithm in generating a signal which generates a first CMA signal employed in adapting the coefficients employed in the Forward Equalizer FE1 and the Feedback Equalizer FBE, i.e., the error signal generated by processor CMA1 is used to adapt less than all the coefficients in the DBBF antenna system 100. A second processor CMA2 receives the output of Forward Equalizer FE2 and generates a second CMA, i.e., error, signal employed in adapting the coefficients used in Forward Equalizer FE2.

It will be appreciated that the signal at the output of Forward Equalizer FE2 advantageously can be employed to adapt the coefficients of that forward equalizer based on a blind adaptation algorithm; the antenna connected to the Forward Equalizer FE2 can be referred to as "the independent antenna". In contrast, the signal at the output of the Forward Equalizer FE1 could be used to adapt the coefficients of the Forward Equalizer FE1 and the Feedback Equalizer FBE based on another blind adaptation algorithm. This is shown in FIG. 2. Hence, two error signals would be created; all of the coefficients employed in the adaptive DBBF antenna system 100 would not be based on one adaptation algorithm and associated error signal.

Figure 3:
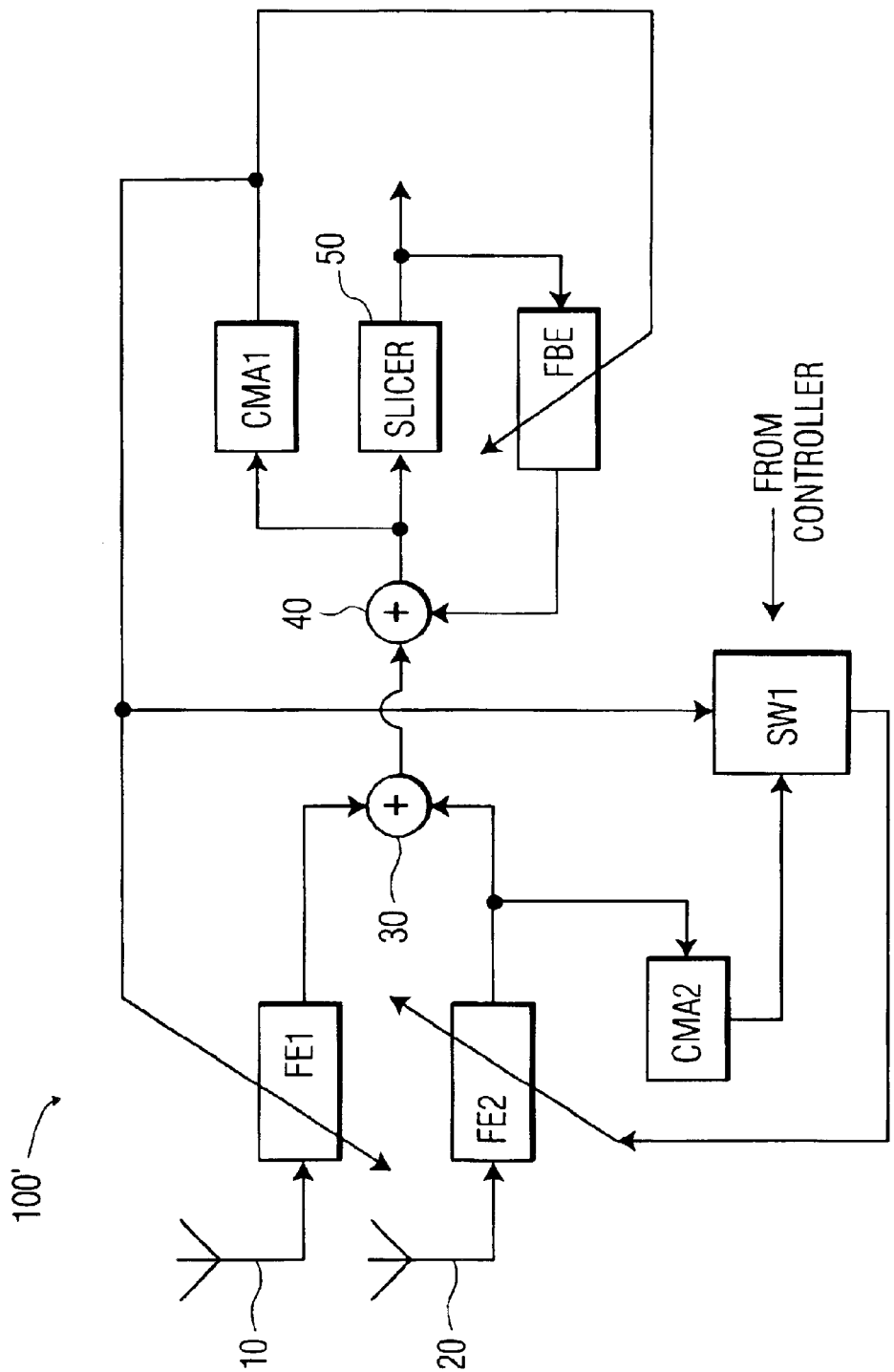
FIG. 3 is a high-level block diagram of one preferred embodiment of an adaptive antennae structure utilizing multiple feedback signals according to the present invention, which structure has first and second modes of operation.

It should be mentioned that the operating mode illustrated in FIG. 2 is only utilized in the blind (CMA) mode. When the adaptive antenna structure, i.e., antenna system 100, is working in Trained or Decision Directed (DD) mode, it only uses one error signal, i.e., the signal corresponding to the error at the output of the slicer 50—as in the conventional adaptive DBBF antenna system 1 illustrated in FIG. 1. The adaptive DBBF antenna system 100' illustrated in FIG. 3 includes a switch SW1, which responds to a control signal supplied by, for example, a controller disposed in the tuner (not shown), to disconnect the output from processor CMA2 and to apply the output of processor CMA1 to the Forward Equalizer FE2.

It should also be mentioned that there are two blind adaptation algorithms, one controlling the coefficients employed by the Forward Equalizer FE1 and the Feedback Equalizer FBE and the other controlling the coefficients employed by the Forward Equalizer FE2. It will be appreciated that the constant in the CMA is different for each. Assuming that there would be equal power in each antenna, then the CMA constant for processor CMA1 would be approximately half of the CMA constant for processor CMA2. The equation for the CMA is set forth in equation (4):

$$c_n(k+1) = c_n(k) + v_k \hat{I}_k \left( \hat{I}_k^2 - |\gamma_m|^2 \right) \quad (4)$$

where $c_n(k)$ is the $n^{th}$ equalizer coefficient at time k, $v_k$ is the equalizer input, $\hat{I}_k$ is the equalizer output and $|\gamma_m|^2$ is the CMA constant inside the Godard cost function for the $m^{th}$ antenna. If there is not equal power in the two antennae (an indicator of which can be supplied from an automatic gain control circuit (AGC) associated with the tuner or receiver (not shown)), then the value of $\square_m$ advantageously can be scaled appropriately. See FIG. 2.

Figure 4:
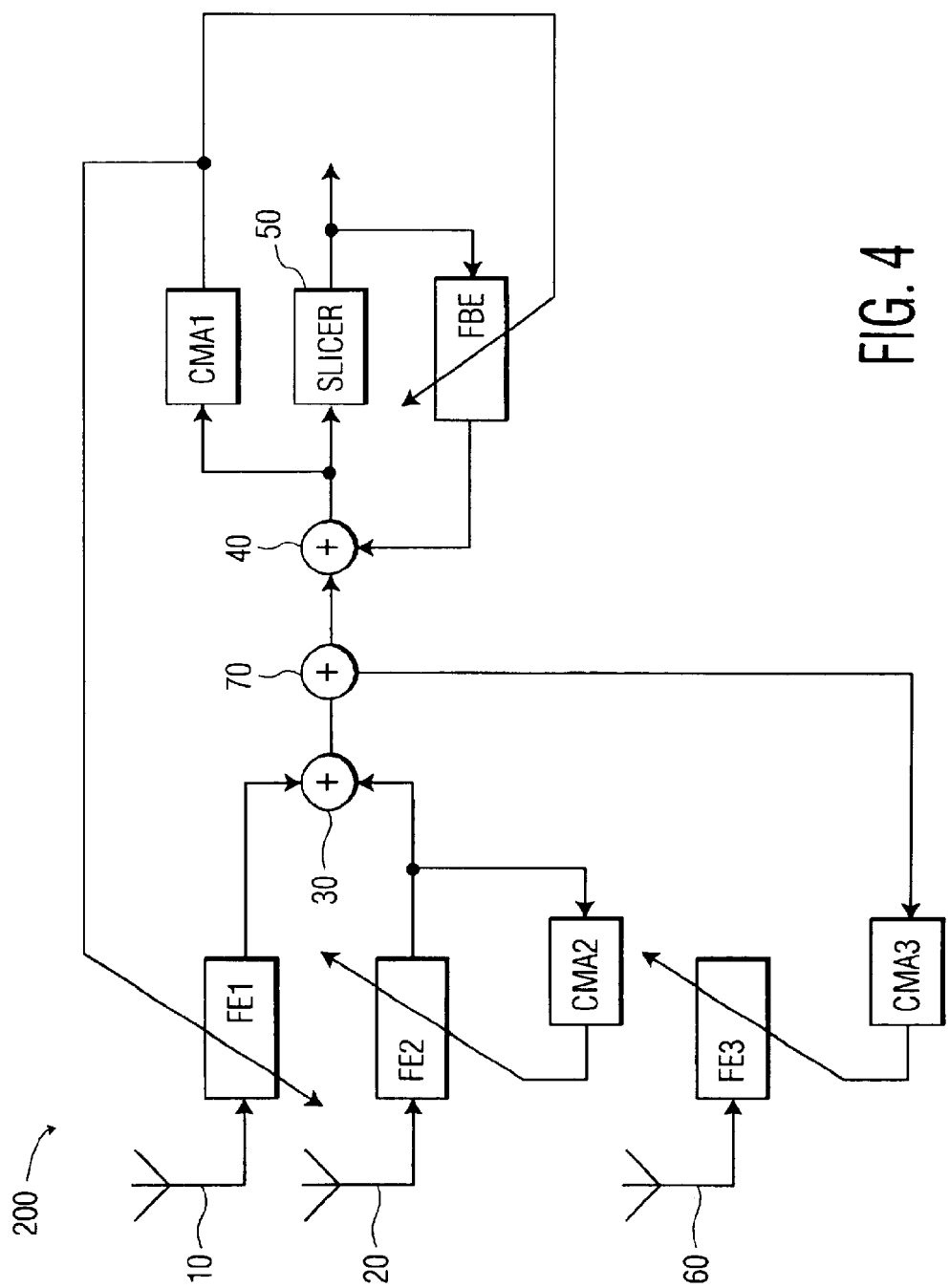
FIG. 4 is a high-level block diagram of another preferred embodiment of an adaptive antennae structure utilizing multiple feedback signals according to the present invention.

Advantageously, this novel adaptation structure gives the adaptive DBBF antenna system another degree of freedom that is not available in antennas employing the single error adaptive antenna algorithm. In other words, while it is not possible to build multiple degrees of freedom in a standard single antenna employing a Decision Feedback Equalizer (DFE) structure, it is both possible and practical to introduce multiple degrees of freedom in a multiple antenna DFE structure. It will be appreciated that a myriad of adaptation algorithms are possible; the adaptive DBBF antenna system employing the DEAD algorithm being but one such solution, albeit one that seems to be an optimal solution based on the performance demonstrated by the system, as discussed below. Other structures are possible, as illustrated in FIG. 4, wherein three Forward Equalizer FE1, FE2, and FE3 are controlled via three processors CMA1, CMA2, and CMA3, respectively, in the antenna system 200.

It should be mentioned that another advantage to this structure is that the effects of error propagation in the Feedback Equalizer FBE influence only Forward Equalizer FE1 and not both of the Forward Equalizers FE1 and FE2. Hence, when there is significant error propagation, then the DEAD algorithm may be advantageous because of this insensitivity.

The performance of the adaptive DBBF antenna system 100 employing the DEAD algorithm is illustrated in the tables below. Table I illustrates antenna system performance for two equal channels; Table II illustrates antenna system performance given one good channel and one very poor channel. It will be appreciated that columns depicting signal-to-noise (SNR) ratio and symbol error rate (SER) are used in illustrating the performance of the antenna system illustrated in FIG. 2 over the antenna system illustrated in FIG. 1.

TABLE I

|  | SNR | SER |
| --- | --- | --- |
| Original DBBF | 19.79 dB | 0.05143 |
| DEAD – FE1 + (FE2 + FBE) | 20.29 dB | 0.04285 |
| DEAD – (FE1 + FBE) + FE2 | 20.26 dB | 0.03857 |

TABLE II

|  | SNR | SER |
| --- | --- | --- |
| Original DBBF | 19.13 dB | 0.0728 |
| DEAD – FE1 + (FE2 + FBE) | 19.14 dB | 0.0628 |
| DEAD – (FE1 + FBE) + FE2 | 16.98 dB | 0.1571 |

As can be seen from these results, this new adaptation technique is as good as, and better in some conditions than, the single error multiple antennae DFE structure (DBBF structure). The simulation results presented in Tables I and II demonstrate a 0.5 dB gain for the set of channels simulated. It should be mentioned that, in theory, this gain could be higher depending on the set of channels. However, it should also be noted that the DEAD algorithm performed worse in one case, i.e., when the channel on "the independent antenna" was worse than the channel on the other antenna. Therefore, "the independent antenna" is constrained to be the antenna that has the better SNR, so a switching mechanism is required. This switching could be done in baseband as it is really only switching of the adaptation algorithm and not of the signal flow. A level of channel SNR quality could be received from the AGC in the tuner to provide the switching input.

In short, a multiple error adaptive antenna structure can provide some SNR gains over a single error adaptive antenna structure. Any problems associated with the DEAD algorithm can be overcome by utilizing antenna switching. Although two and three antenna systems are illustrated, it will be appreciated that the antenna system according to the present invention advantageously can include N antennae, where N is an integer greater than 1.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. An adaptive antenna system, comprising:

N antennae, wherein N is an integer greater than 1;

N forward equalizers operatively coupled to a respective one of the N antennae;

N processors performing a constant modulus algorithm (CMA) to thereby generate N respective control signals which adapt coefficients associated with each respective one of the forward equalizer a decision device receiving a signal based on the collected output of the N forward equalizers; and a feedback equalizer receiving an output of the decision device and generating a feedback signal biasing the signal received by the decision device, wherein a first control signal generated by one of said Nth processor adapts coefficients associated with the feedback equalizer and wherein a second control signal independent from the feedback equalizer is generated by a second processor among said N processors so as to adapt coefficients for a corresponding forward equalizer.

2. The adaptive antenna system as recited in claim 1, wherein each of the N processors implement the equation:

$$c_n(k+1) = c_n(k) + v_k \hat{I}_k (\hat{I}_k^2 - |\gamma_m|^2)$$

where:

$c_n(k)$ is the $n^{th}$ equalizer coefficient at time k, $v_k$ is the equalizer input, $\hat{I}_k$ is the equalizer output; and $|\gamma_m|^2$ is the CMA constant inside a Godard cost function for the $m^{th}$ antenna.

3. The adaptive antenna system as recited in claim 2, wherein the equation implemented by each processor employs a different coefficient $|\gamma_m|^2$.

4. An adaptive antenna system, comprising:

first and second antennae;

first and second forward equalizers operatively coupled to a respective one of the first and second antennae;

a first combiner receiving first and second forward equalizes signals generated by the first and second forward equalizers;

a slicing circuit receiving a signal based on the combined signal output by the first combiner; and first and second processors, each performing a constant modulus algorithm (CMA) to thereby generate respective first and second control signals which adapt coefficients associated with a respective one of the first and second forward equalizers wherein the first processor receives an input signal based on the output of the slicing circuit, wherein said second processor performs a constant modulus algorithm (CMA) to generate said second control signal independent of the output of said slicing circuit.

5. The adaptive antenna system as recited in claim 4, wherein:

the first and second control signals are applied to the first and second forward equalizers, respectively, during a first operating mode; and the first control signal is applied to the first and second forward equalizers during second mode of operation.

6. The adaptive antenna system as recited in claim 4, further comprising:
a second combiner disposed between the first combiner and the slicing circuit; and
a feedback equalizer that receives an output of the slicing circuit and generates a feedback signal,
wherein:
the feedback signal is applied to a second input port of the second combiner to thereby bias the signal received by the slicing circuit; and
the first control signal generated by the first processor adapts coefficients associated with the feedback equalizer.

7. The adaptive antenna system as recited in claim 4, wherein the first and second processors implement the algorithm:

$$c_n(k+1) = c_n(k) + v_k \hat{I}_k (\hat{I}_k^2 - |\gamma_m|^2)$$

where:
$c_n(k)$ is the $n^{th}$ equalizer coefficient at time k,
$v_k$ is the equalizer input,
$\hat{I}_k$ is the equalizer output; and
$|\gamma_m|^2$ is the CMA constant inside a Godard cost function for the $m^{th}$ antenna, where n is equal 2.

8. The adaptive antenna system as recited in claim 7, wherein the equation implemented by the first and second processors each employs a different coefficient $|\gamma_m|^2$.

9. The adaptive antenna system as recited in claim 5, further comprising a switch for selectively applying one of the first and second control signals to the second forward equalizer.

10. A beam forming antenna system employing first and second antennae and a blind dual error antenna diversity (DEAD) algorithm, comprising:
first forward equalizing means operatively coupled to a first antenna and receiving a first control signal for generating a first forward equalized signal;
second forward equalizing means operatively coupled to a second antenna and receiving a second control signal for generating a second forward equalized signal;
first processing means for generating the first control signal based on a combination of the first and second forward equalized signals; and
second processing means receiving the second forward equalized signal for generating the second control signal.

11. The beam forming antenna system as recited in claim 10, further comprising:
slicing means for receiving a signal based on the a combination of the first and second forward equalized signals.

12. The beam forming antenna system as recited in claim 11, further comprising:
feedback means for generating a feedback signal based on the combination signal,
wherein:
the feedback means generate a bias signal for biasing the combination of the first and second equalized signals, and
the coefficients employed by the feedback means are controlled by the first control signal.

13. The beam forming antenna system as recited in claim 10, wherein:

the first and second control signals are applied to the first and second forward equalizing means, respectively, during a first operating mode; and
the first control signal is applied to the first and second forward equalizing means during a second mode of operation.

14. The beam forming antenna system as recited in claim 10, wherein the first and second processing means implement the algorithm:

$$c_n(k+1) = c_n(k) + v_k \hat{I}_k (\hat{I}_k^2 - |\gamma_m|^2)$$

where:
$c_c(k)$ is the $n^{th}$ equalizer coefficient at time k,
$v_k$ is the equalizer input,
$\hat{I}_k$ is the equalizer output; and
$|\gamma_m|^2$ is the CMA constant inside a Godard cost function for the $m^{th}$ antenna, where n is equal 2.

15. A method for operating a beam forming antenna system employing first and second antennae and a blind dual error antenna diversity (DEAD) algorithm, comprising:
generating a first forward equalizing signal in response to a first antenna signal and a first control signal;
generating a second forward equalizing signal in response to a second antenna signal and a second control signal;
combining the first and second forward equalizing signals to produce a combined signal; generating the first control signal based on the combined signal; and
generating the second control signal based on the second forward equalized signal.

16. The method as recited in claim 15, further comprising:
slicing the combined signal,
wherein the step of generating the first control signal is performed responsive to the combination signal.

17. The method as recited in claim 16, further comprising:
generating a feedback signal based on the combination signal; and biasing the combined signal based on the feedback signal.

18. The method as recited in claim 15, wherein the steps by which the first and second control signals are generated implement the algorithm:

$$c_n(k+1) = c_n(k) + v_k \hat{I}_k (\hat{I}_k^2 - |\gamma_m|^2)$$

where:
$c_n(k)$ is the $n^{th}$ equalizer coefficient at time k,
$v_k$ is the equalizer input,
$\hat{I}_k$ is the equalizer output; and
$|\gamma_m|^2$ is the CMA constant inside a Godard cost function for the $m^{th}$ antenna, where n is equal 2.

19. The method as recited in claim 15, wherein the steps for generating the first and second Forward Equalizing signals further comprise:
generating a first forward equalizing signal in response to a first antenna signal and a first control signal using first coefficients; and
generating a second forward equalizing signal in response to a second antenna signal and a second control signal using second coefficients,
wherein the first and second coefficients are selected responsive to the first and second control signals, respectively.

* * * * *